United States Patent [19]

Ikeda

[11] Patent Number: 5,645,145
[45] Date of Patent: Jul. 8, 1997

[54] BRAKE BOOSTER

[75] Inventor: Masahiro Ikeda, Higashimatsuyama, Japan

[73] Assignee: Jidosha Kiki Co., Ltd., Tokyo, Japan

[21] Appl. No.: 639,445

[22] Filed: Apr. 29, 1996

[30] Foreign Application Priority Data

May 29, 1995 [JP] Japan .................. 7-130785

[51] Int. Cl.$^6$ .................................. B60T 13/00
[52] U.S. Cl. ........................... 188/356; 303/114.3
[58] Field of Search ............... 303/114.3, 113.4, 303/155, 2, 50, 115.3; 188/356, 357; 60/553, 574, 550, 547.1; 91/364, 519, 376 R, 369.1, 369.2, 369.3, 369.4

[56] References Cited

U.S. PATENT DOCUMENTS

| 4,110,985 | 9/1978 | Gordon et al. | 60/550 |
| 4,172,364 | 10/1979 | Young | 60/553 |
| 4,565,067 | 1/1986 | Tani et al. | 303/22.8 |
| 5,475,977 | 12/1995 | Gautier et al. | 91/369.1 |
| 5,475,978 | 12/1995 | Gautier et al. | 91/369.2 |

Primary Examiner—Douglas C. Butler
Attorney, Agent, or Firm—Kanesaka & Takeuchi

[57] ABSTRACT

In a brake booster of the present invention, a valve plunger (20) rapidly moves forward to come into contact with a shaft portion (33a) of a first piston (33) and then presses the first piston (33) to quickly move forward according to the pedal pressure developed by quickly pedaling a brake pedal during emergency braking. Therefore, before an output shaft (32) outputs, i.e., before pressure is developed in a first fluid chamber (36) filled with fluid, the front end of a second cup packing (39) passes an open end of a first fluid path (31) formed at the first piston (33) side. As a result, the communication between the first fluid chamber (36) and the second fluid chamber (37) is permitted through the first fluid path (31) and a second fluid path (34) so that the fluid within the first fluid chamber (36) flows to the second fluid chamber (37), thereby stopping a reaction mechanism of the pressure in the first fluid chamber (36) and allowing the full load output of the brake booster (1) all at once.

5 Claims, 6 Drawing Sheets

BRAKE BOOSTER

BACKGROUND OF THE INVENTION

The present invention relates to a brake booster for outputting braking force by increasing pedal pressure by a vacuum force, more particularly to a brake booster for generating braking force greater than braking force controlled by pedal pressure in case of emergency braking.

Conventionally, a braking equipment of a vehicle such as a passenger car comprises a brake booster with a vacuum booster using a vacuum, a master cylinder which is driven by the brake booster to develop brake fluid pressure, wheel cylinders which are supplied with the brake fluid pressure to generate braking force, and an anti-skid brake system (hereinafter, referred to as "ABS") for controlling the brake fluid pressure.

In such a braking equipment, when a driver pedals a brake pedal, the brake fluid pressure developed by the master cylinder is always proportional to the pedal pressure. Accordingly, the braking equipment is not able to generate braking force which is greater than braking force controlled by the pedal pressure by the driver. As a result of this, there is a possibility that the vehicle can not be securely and safely stopped for shortage of braking force when emergency braking is required.

Therefore, a braking equipment, which allows full load operation of the brake booster in case of emergency braking and controls its brake fluid pressure by the ABS so that braking force greater than that controlled by the pedal pressure is outputted during the emergency braking, is proposed in Japanese Unexamined Published Patent Application No. 06-179361.

The braking equipment disclosed in '361 electrically detects the pedaling speed of the brake pedal. When the pedaling speed is greater than a predetermined value, the braking equipment rapidly makes the pressure within a variable pressure chamber to be the atmospheric pressure to allow the full load operation of the brake booster and control the brake fluid pressure by the ABS, thereby securely and safely stopping the vehicle during the emergency braking.

However, in the '361 braking equipment, an electromagnetic valve is used, the stroke of the brake pedal is detected, and an electronic controller controls the electromagnetic valve according to electric detected signal of the pedaling speed, thereby making the structure of the '361 braking equipment complex and the cost higher due to the electronic control devices.

SUMMARY OF THE INVENTION

The object of the present invention is to provide a brake booster which makes a variable pressure chamber thereof in the atmospheric pressure all at once during emergency braking by a control means mechanically structured therein, not electrically detecting the pedaling speed of a brake pedal, further has a simple structure and enables the cost to be reduced.

For accomplishing the object, a brake booster of the present invention comprises at least: a valve body arranged to move forward and backward relative to a space surrounded by a front shell and a rear shell and piercing the rear shell sealingly and slidably; a power piston connected to the valve body and dividing the space into a constant pressure chamber in which vacuum is introduced and a variable pressure chamber in which the atmosphere is introduced during braking; a valve plunger slidably disposed in the valve body; an input shaft connected to the valve plunger, arranged to move forward and backward in the valve body, and actuated by a brake operating member; a vacuum valve disposed in the valve body and controlled by the forward or backward movement of the valve plunger to allow or block the communication between the constant chamber and the variable chamber; an air valve disposed in the valve body and controlled by the forward or backward movement of the valve plunger to allow or block the communication between the variable chamber and the atmosphere; and an output shaft for outputting to an external device such as a master cylinder, and further comprises: a first fluid chamber disposed between the valve plunger and the output shaft, sealingly filled with fluid and controlled in its volume to be reduced by the forward movement of the valve plunger or backward movement of the output shaft; a second fluid chamber sealingly filled with fluid of which volume is variable; and a fluid flow control valve which blocks the flow of the fluid from the first fluid chamber to the second fluid chamber when the valve plunger moves forward at a speed corresponding to an operational speed of the brake operating member during normal braking and, on the other hand, is actuated by the forward movement of the valve plunger to allow the flow of the fluid from the first fluid chamber to the second fluid chamber when the valve plunger moves forward at a speed exceeding a predetermined value corresponding to the operational speed of the brake operating member during emergency braking.

Moreover, the present invention further comprises a fluid path for allowing the communication between the first fluid chamber and the second fluid chamber and a piston disposed opposite to the first fluid chamber and actuated by the valve plunger, wherein the fluid flow control valve is provided with a cup packing disposed to the piston to open and block the fluid path.

In the present invention as structured above, the valve plunger moves forward at a normal speed during normal braking. Accordingly, the vacuum valve is closed and the air valve is opened to introduce the atmosphere into the variable pressure chamber. In this case, the rate of opening valve is relatively small so that the pressure in the variable pressure chamber rises at a normal speed. The brake booster thereby outputs for normal braking through the output shaft by the operation of the power piston while the pressure in the first fluid chamber is increased by the reaction force from the output shaft. Since the valve plunger moves forward at the normal speed, the valve plunger does not reach the position, where the fluid flow control valve is actuated, before the pressure in the first fluid chamber raises, with the result that the fluid is sealed in the first fluid chamber. Since the pressure in the first fluid chamber therefore prevents the valve plunger from further forward movement, that is, the pressure in the first fluid chamber acts as the reaction mechanism of the b rake booster, the rate of opening valve for the air valve is kept to correspond to the pedal pressure during the normal braking.

During emergency braking, the valve plunger rapidly moves forward. Accordingly, the vacuum valve is closed and the air valve is opened to introduce the atmosphere into the variable pressure chamber. In this case, the valve plunger reaches the position where the fluid flow control valve is opened before the output shaft outputs and the pressure in the first fluid chamber rises to develop the reaction force. By the opening of the fluid flow control valve, the fluid in the first fluid chamber flows to the second fluid chamber. Since, therefore, a pressure is not developed in the first fluid chamber, the valve plunger is not effected by the pressure of the first fluid chamber so as to move forward to reach a maximum all at once. That is, the reaction mechanism by the pressure of the first fluid chamber is canceled instantly. As a result of this, the rate of opening valve for the atmosphere reaches its maximum rate all at once and the output of the brake booster reaches the full road all at once, thereby rapidly and securely providing the emergency braking. Therefore, the operational responsibility of the brake booster during emergency braking is improved.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1:
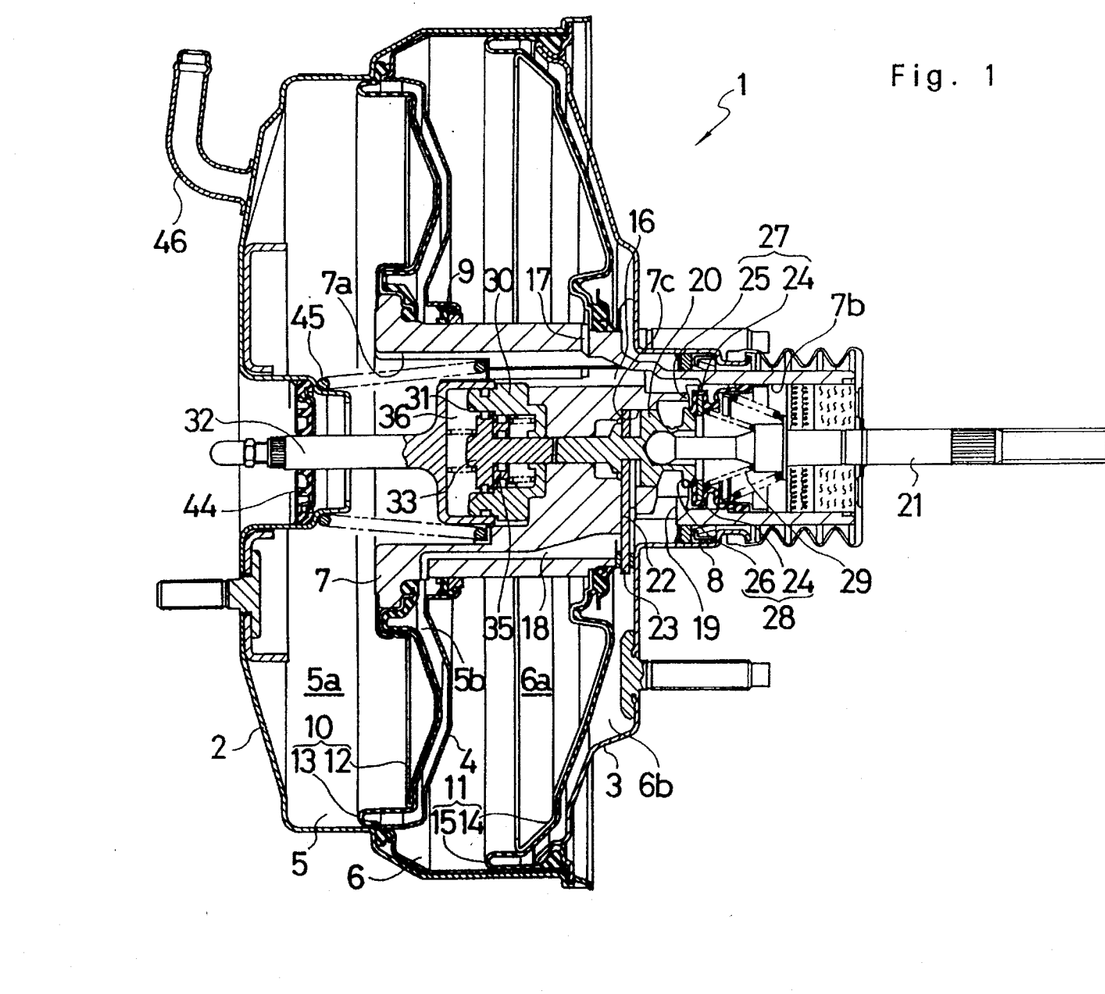
FIG. 1 is a sectional view showing an embodiment of a brake booster according to the present invention.

As shown in FIG. 1, a brake booster 1 comprises a front shell 2 and a rear shell 3 which are connected with each other to form a chamber. The chamber is divided into a front chamber 5 and a rear chamber 6 by a center plate 4.

The brake booster 1 has a valve body 7 disposed to pierce the rear shell 3 and the center plate 4. The valve body 7 is slidably supported by the rear shell 3 and the center plate 4 and sealed by a pair of seal members 8 and 9. The valve body 7 is connected to a front power piston 10 disposed in the front chamber 5 and a rear power piston 11 disposed in the rear chamber 6. The front power piston 10 comprises a front power piston member 12 connected to the valve body 7 and a front diaphragm 13 in which an outer edge is clamped between the front shell 2 and the center plate 4 at the back of the front power piston member 12 and is which an inner edge is fixed to the valve body 7. The rear power piston comprises a rear power piston member 14 connected to the valve body 7 and a rear diaphragm 15 in which an outer edge is clamped between the rear shell 3 and the center plate 4 at the back of the rear power piston member 14 and in which an inner edge is fixed to the valve body 7. The front chamber 5 is divided into a first constant pressure chamber 5a and a first variable pressure chamber 5b by the front power piston 10. The rear chamber 6 is divided into a second constant chamber 6a and a second variable pressure chamber 6b by the rear power piston 11.

The valve body 7 is provided with a hole 7a for communicating with the first constant pressure chamber 5a, a hole 7b for communicating with the atmosphere, and a hole 7c connected to the hole 7b and having a diameter smaller than that of the hole 7b. The valve body 7 is also provided with a path 16 extending axially for allowing communication between the holes 7a and 7b and a path 17 extending radially for allowing communication between the path 16 and the second constant pressure chamber 6a. Moreover, the valve body 7 is provided with a path 18 extending axially for allowing communication between the second variable pressure chamber 6b and the first variable pressure chamber 5b and a path 19 for allowing communication between the second variable chamber 6b and the hole 7c.

A valve plunger 20 is slidably inserted into the hole 7c of the valve body 7. The valve plunger 20 is connected to the input shaft 21 at the right end thereof. The input shaft 21 is connected to a brake pedal 48 (shown in FIG. 5 described later). A key member 23 is inserted into the valve plunger 20, passing through a hole 22, which extends radially and is formed in the valve body 7, and projecting toward the inside of the hole 7c. The key member 23 is axially movable within a predetermined range relative to the valve body 7 and also axially movable within a predetermined range relative to the valve plunger 20. The key member 23 prevents the valve plunger 20 from coming off the valve body 7.

The valve body 7 is provided with a valve disc 24 and a first valve seat 25 on which the valve element 24 can be seated. The valve plunger 20 is provided with a second valve seat 26, formed in a ring shape on which the valve element 24 can be seated, at the rear end thereof and inside the first valve seat 25. The second valve seat 26 is disposed coaxially with the first valve seat 25. The valve element 24 and the first valve seat 25 constitute a vacuum valve 27 and the valve element 24 and the second valve seat 26 constitute an air valve 28. The valve element 24 has a portion which is seated on the first and second valve seats 25 and 26. This portion is movable forwards and backwards and is always biased in such a direction that the portion is seated on the first valve seat 25 by a valve spring 29 disposed between the portion and the input shaft 21 in its compressed state. When the vacuum valve 27 is opened and the air valve 28 is closed, the first and second variable pressure chambers 5b, 6b are communicated with the first and second constant pressure chambers 5a, 6a and are blocked from the atmosphere. On the other hand, when the vacuum valve 27 is closed and the air valve 28 is opened, the first and second variable pressure chambers 5b, 6b are blocked from the first and second constant chambers 5a, 6a and are communicated with the atmosphere.

Figure 2:
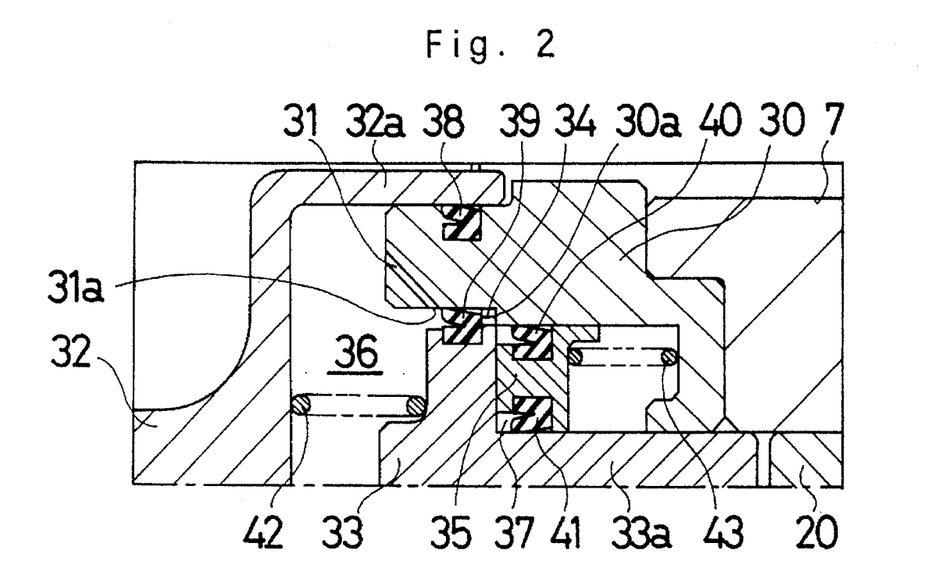
FIG. 2 is a partially enlarged sectional view showing one half of a portion between a valve plunger and an output shaft of the brake booster of the embodiment shown in FIG. 1.

As shown in FIG. 1 and FIG. 2, the valve body 7 is provided with a cylinder member 30 disposed in the hole 7a thereof. The cylinder member 30 is provided with a first fluid path 31, extending tilting to the axial direction and the radial direction, therein. The cylinder member 30 is partially inserted into a cylinder portion 32a which is a rear end part of an output shaft 32. A first piston 33 is slidably inserted into the cylinder member 30 and is provided with a second fluid path 34 extending axially therein. A second piston 35 is inserted into an annular space between a shaft portion 33a of the first piston 33 and the cylinder member 30 and is slidable relative to the shaft portion 33a and the cylinder member 30.

The outer shaft 32, the cylinder member 30, and the first piston 33 form together a first fluid chamber 36. The first fluid chamber 36 is designed to be variable in its volume so that the volume is reduced by forward movement of the first piston 33 i.e. forward movement of the valve plunger 20 and the volume is also reduced by backward movement of the output shaft 32. The first piston 33 and the second piston 35 form together a second fluid chamber 37. The second fluid chamber 37 is designed to be variable in its volume so that the volume is increased by movement of the first piston 33 and the second piston 35 in such a direction that the distance therebetween increases.

The first and second fluid chambers 36 and 37 are filled with fluid sealed therein. The cylinder member 30 is provided with a first cup packing 38 surrounding the outer periphery thereof, thereby preventing the fluid from leaking outside the cylinder member 30 and the cylinder portion 32a. The first piston 33 is provided with a second cup packing 39 surrounding the outer periphery thereof, thereby allowing flow only from the second fluid chamber 37 to the first fluid chamber 36. Moreover, the second piston 35 is provided with a third cup packing 40 and a fourth cup packing 41 surrounding the outer periphery and the inner periphery thereof, respectively, thereby preventing the fluid in the second fluid chamber 37 from leaking the opposite side of the second piston 35.

Between the first piston 33 and the output shaft 32, a first piston spring 42 is disposed in its compressed state to always bias the first piston 33 backward. During the brake is in non-operation, the first piston 33 is in contact with a stepped portion 30a disposed on the cylinder member 30 so that its further rearward movement is prevented. Between the second piston 35 and the cylinder member 30, a second piston spring 43 of which biasing force is smaller than that of the first piston spring 42 is disposed in its compressed state to always bias the second piston 35 forward. During the brake is in non-operation, the second piston 35 is in contact with the first piston 33 so that its further forward movement is prevented.

The rear end of the shaft portion 33a of the first piston 33 is positioned to oppose the front end of the valve plunger 20. As clear from FIG. 2, the distance between the shaft portion 33a of the first piston 33 and the valve plunger 20 when the brake is in non-operation is previously set. However, the valve plunger 20 comes in contact with the shaft portion 33a of the first piston 33 and presses the first piston 33 by forward movement of the valve plunger 20 when the brake is in operation as shown in FIG. 3.

The relation between the position of an open end 31a of the first fluid path 31 disposed at the first piston side and the position of the second cup packing 39 in this embodiment will be described hereinafter. In a position of the first piston 33, as shown in FIG. 2, where the brake is in non-operation, the second cup packing 39 is set to be positioned rearward than the open end 31a. Therefore, the second cup packing 39 in this position prevents the fluid in the first fluid chamber 36 from flowing into the second fluid chamber 37.

Figure 3:
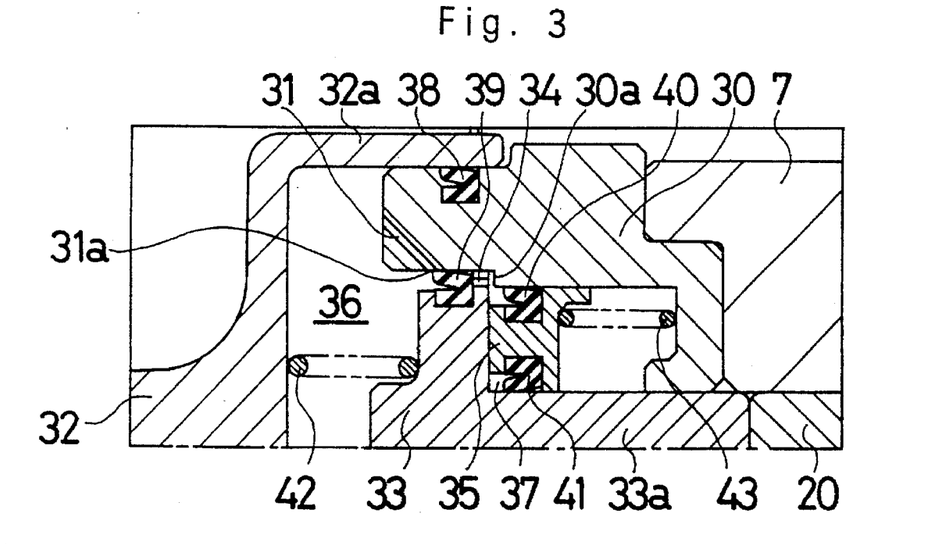
FIG. 3 is a view similar to FIG. 2 for illustrating the operational condition of the brake booster shown in FIG. 1 during its normal braking.

As shown in FIG. 3, during the normal braking, the valve plunger 20 moves forward at a normal speed according to the pedal pressure developed by pedaling the brake pedal 48 at a normal pedaling speed. As a result of this, the valve plunger 20 comes into contact with the first piston 33 and slightly presses the first piston 33. However, during the normal braking, the second cup packing 39 is still positioned rearward than the open end 31a while the output shaft 32 outputs to a master cylinder 49 (shown in FIG. 5) as described later. The reaction force developed here increases the pressure in the first fluid chamber 36. At this point, the second cup packing 39 prevents the fluid in the first fluid chamber 36 from flowing into the second fluid chamber 37 so that the fluid in the first chamber 36 is sealed within the first chamber 36. As a result of this, the pressure in the first fluid chamber 36 is kept at higher pressures, thereby preventing further movement of the first piston 33. The pressure in the first fluid chamber 36 acts as a reaction mechanism during the normal braking.

Figure 4:
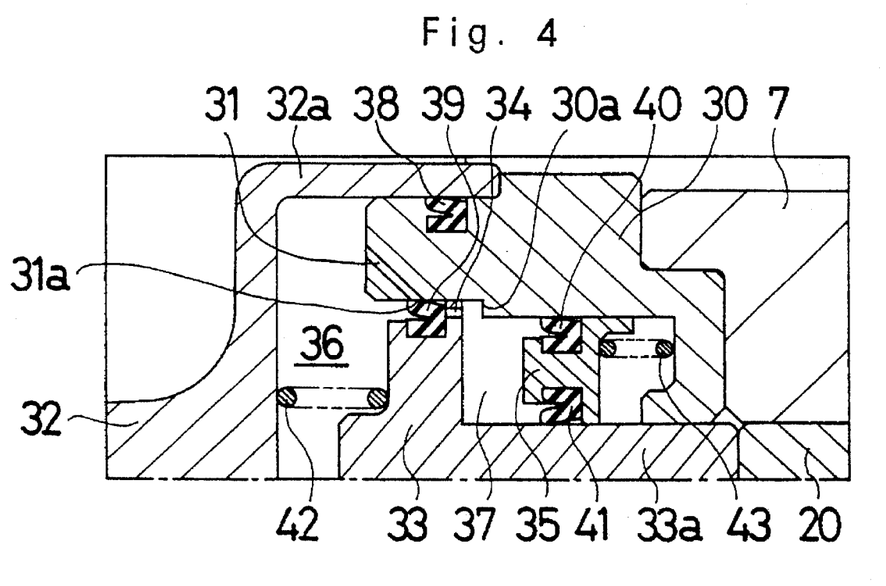
FIG. 4 is a view similar to FIG. 2 for illustrating the operational condition of the brake booster shown in FIG. 1 during its emergency braking.

As shown in FIG. 4, during emergency braking, the valve plunger 20 moves forward at a higher speed according to the pedal pressure developed by pedaling the brake pedal at a higher pedaling speed. In this case, the valve plunger 20 comes into contact with the first piston 33 and rapidly presses the first piston 33 forward. As described later, the second cup packing 39 moves forward than the open end 31a because of the time lug between movements of the first piston 33 and the cylinder member 30 before the output shaft 32 outputs to the master cylinder 49. In this position of the second cup packing 39, the fluid in the first fluid chamber 36 flows into the second fluid chamber 37 through the first fluid path 31, a space between the back of the second cup packing 39 and the cylinder member 30, and the second fluid path 34. Therefore, the pressure in the first fluid chamber 36 is not increased so that the reaction mechanism by the pressure of the first fluid chamber 36 is canceled instantly. As a result of this, the output reaches to the full load all at once. As described above, the second cup packing 39 and the open end 31a of the first fluid path 31 constitute a fluid flow control valve, formed as a mechanical control valve, of the present invention.

The front end portion of the output shaft 32 pierces the front shell 2 slidably and sealingly by a sealing member 44 to project outside and is operationally linked with a piston of the master cylinder 49 at the front end thereof.

The valve body 7 and the power pistons 10, 11 connected to the valve body 7 are always biased backward by a return spring 45. During the brake is in non-operation, the key member 23 comes into contact with the rear shell 3 as shown in FIG. 1 to prevent forward movement of the valve body 7 and the valve plunger 20. Therefore, the valve body 7 and the valve plunger 20 is kept in the rearmost position.

The first constant pressure chamber 5a is communicated with the source of vacuum such as an intake manifold (not shown) through a vacuum introduction tube 46 mounted on the front shell 2. Therefore, the first and second constant pressure chambers 5a, 6a are always vacuumed.

Figure 5:
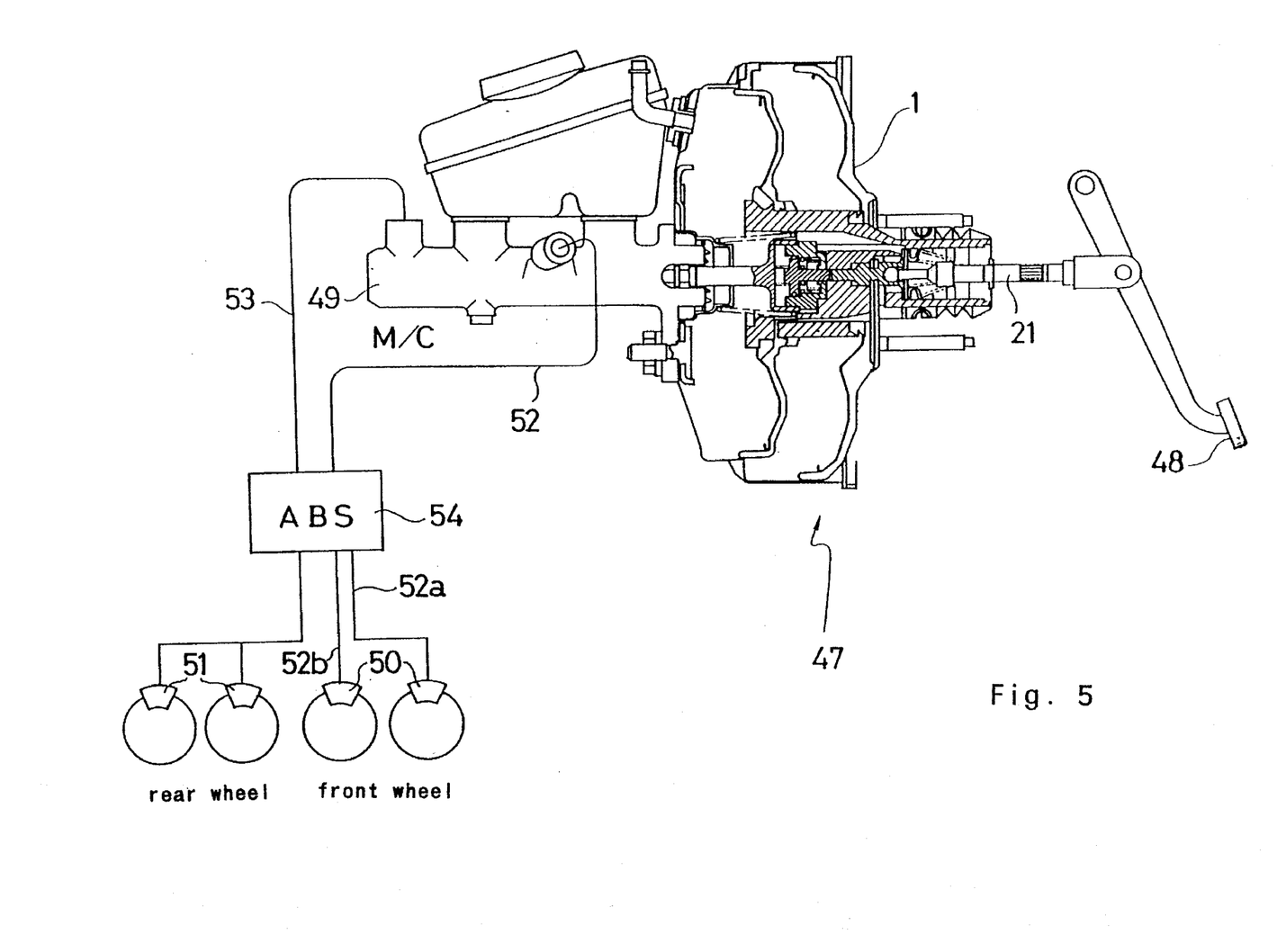
FIG. 5 is a view showing an example of a braking equipment in which the brake booster shown in FIG. 1 is used.

The brake booster 1 of this embodiment as structured above is used in a braking equipment 47 as shown in FIG. 5. In FIG. 5, numeral 48 designates the brake pedal connected to the input shaft 21, 49 designates the tandem master cylinder mounted to the brake booster 1 which is actuated by the brake booster 1 to develop brake fluid pressure, 50 designates front wheel cylinders for respective front wheels, 51 designates rear wheel cylinders for respective rear wheels, 52 designates a front brake line for the front wheels, 52a designates a front-right brake line for a front-right wheel, 52b designates a front-left brake line for a front-left wheel, 53 designates a rear wheel brake line, and 54 designates an anti-skid brake system (ABS).

In the braking equipment using the brake booster 1 of this embodiment, during the brake is in non-operation i.e. the brake pedal 48 is not pedaled, the valve body 7, the power pistons 10 and 11, the valve plunger 20, the input shaft 21, and the output shaft 32 are positioned as shown in FIG. 1 and FIG. 2. The first and second pistons 33, 35 are similarly positioned as shown in FIG. 1 and FIG. 2. When the brake booster 1 is in this position, the vacuum valve 27 is opened and the air valve 28 is closed. That is, the first and second variable pressure chambers 5b, 6b are connected to the first and second constant pressure chambers 5a, 6a and are blocked from the atmosphere so that there is no differential pressure among the first and second variable pressure chambers 5b, 6b and the first and second constant pressure chambers 5a, 6a.

Figure 6:
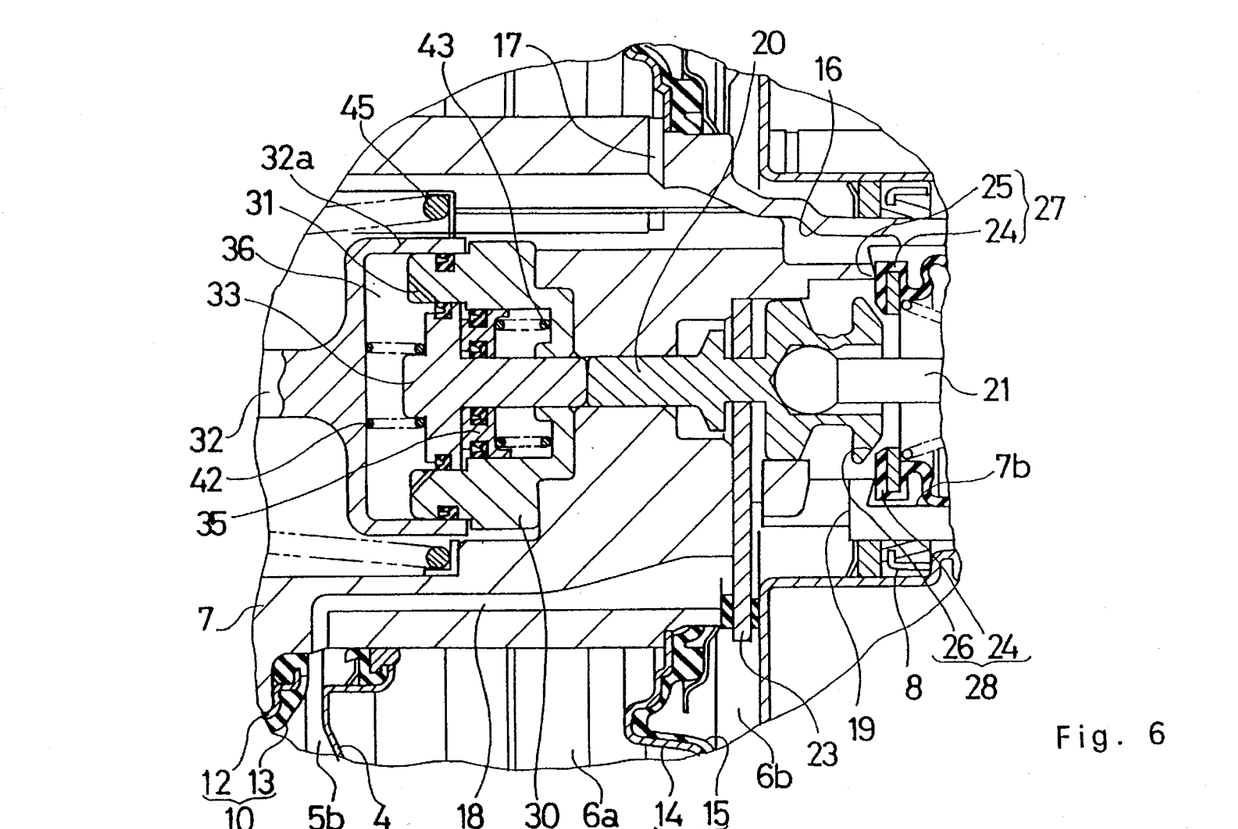
FIG. 6 is a view showing a relation between the condition of a breather valve and the condition of a reaction mechanism during its normal braking of the brake booster shown in FIG. 1.
Figure 7:
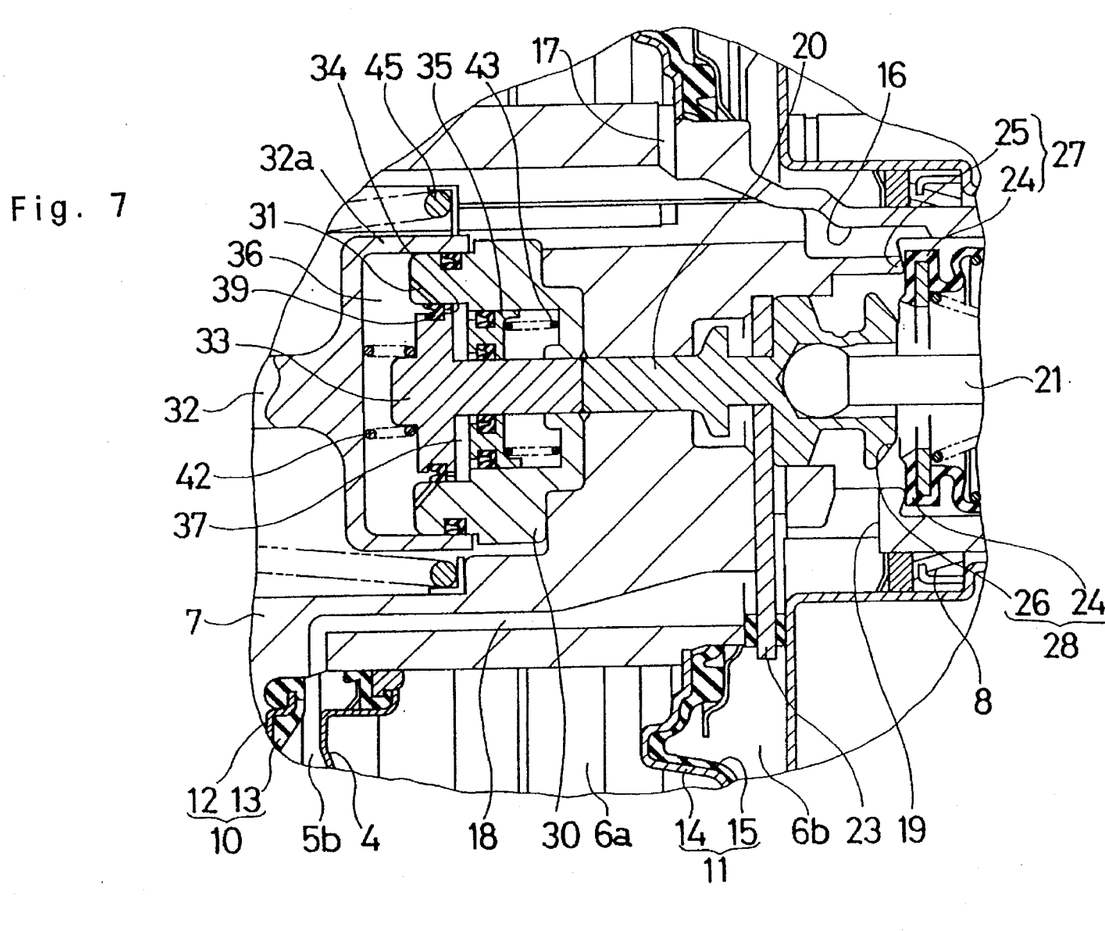
FIG. 7 is a view showing a relation between the condition of the breather valve and the condition of the reaction mechanism during its emergency braking of the brake booster shown in FIG. 1.

Once the brake pedal 48 is pedaled at the normal pedaling speed for normal braking, the input shaft 21 moves forward and the valve plunger 20 also moves forward. Therefore, as shown in FIG. 6, the valve element 24 is seated on the first valve seat 25 to close the vacuum valve 27 and, at the same time, the second valve seat 26 moves away from the valve element 24 to open the air valve 28. That is, the first and second variable pressure chambers 5b and 6b are blocked from the first and second constant pressure chambers 5a and 6a and are communicated with the atmosphere. Then, the atmosphere is introduced to the second variable pressure chamber 6b through the hole 7b, the opened air valve 28, and the path 19 and further to the first variable pressure chamber 5b through the path 18. As a result, there are differential pressures between the first variable pressure chamber 5b and the first constant pressure chamber 5a and between the second variable pressure chamber 6b and the second constant pressure chamber 6a, respectively. The respective differential pressures move the power pistons 10, 11 forward and thus move the output shaft 32 forward through the valve body 7, the cylinder member 30, and the fluid in the first fluid chamber 36. The brake booster 1 outputs as described above so that the master cylinder 49 develops the brake fluid pressure which is then supplied to the front and rear wheel cylinders 50 and 51 through the brake lines 52 and 53, respectively, for normal braking. In this case, the brake fluid pressure is controlled by the ABS 54. The pressure in the first fluid chamber 36 is increased by the reaction force of the output shaft 32.

Since the driver does not rapidly pedal the brake pedal 48 for the normal braking, the valve plunger 20 moves forward to come in contact with the shaft portion 33a of the first piston 33 to move the first piston 33 forward, as shown in FIG. 3 and FIG. 6. In this case, since the driver pedals the brake pedal 48 at the normal pedaling speed, the first piston 33 moves forward at the normal speed relative to the cylinder member 30. However, before the front end of the second cup packing 39 of the first piston 33 reaches the open end 31a, the brake booster 1 outputs from the output shaft 32. The reaction force thus generated increases the pressure in the first fluid chamber 36. The increased pressure prevents the first piston 33 from moving forward relative to the cylinder member 30. As a result, the front end of the second cup packing 39 never passes the open end 31a of the first fluid path 31 in case of normal braking, as shown in FIG. 2.

The pressure in the first fluid chamber 36 rises according to the output. Then, the brake reaction force generated by the risen pressure is transmitted to the driver through the first piston 33, the valve plunger 20, the input shaft 21, and the brake pedal 48 not shown.

Once the brake pedal 48 is released to cancel the braking, both the input shaft 21 and the valve plunger 20 return backwards. Therefore, the valve disc 24 is seated on the second valve seat 26 to close the air valve 28 and, at the same time, the first valve seat 25 moves away from the valve element 24 to open the vacuum valve 27. That is, the first and second variable pressure chambers 5b, 6b are blocked from the atmosphere and are communicated with the first and second constant pressure chambers 5a, 6a. Therefore, the atmosphere within the second variable pressure chamber 6b is exhausted to the first constant pressure chamber 5a through the path 19, the opened vacuum valve 27, and the path 16, and the atmosphere within the first variable pressure chamber 5b is exhausted to the first constant pressure chamber 5a through the path 18, the path 19, the opened vacuum valve 27, and the path 16. Further, the atmosphere flows out the intake manifold through the path 46. As a result of this, the biasing force of the return spring 45 returns the valve body 7 and the power pistons 10, 11 to the non-operating position shown in FIG. 1. According to the returning motion of the valve body 7, the output shaft 32 is returned by the return spring of the piston of the master cylinder 49, thereby canceling the normal braking.

Once the brake pedal 48 is pedaled at a pedaling speed significantly higher than the normal pedaling speed for emergency braking, the input shaft 21 and the valve plunger 20 move forward quickly. Therefore, the valve element 24 is seated on the first valve seat 25 to close the vacuum valve 27 and, at the same time, the second valve seat 26 moves away from the valve element 24 to open the air valve 28. That is, the first and second variable pressure chambers 5b, 6b are blocked form the first and second constant pressure chambers 5a, 6a and are communicated with the atmosphere. Therefore, the atmosphere is introduced into the second variable pressure chamber 6b through the hole 7b, the opened air valve 28, and the path 19 and then to the first variable pressure chamber 5b through the path 18.

However, during the emergency braking, since the driver pedals the brake pedal 48 quickly, the valve plunger 20 moves forward quickly and thus comes into contact with the shaft portion 33a of the first piston 33 to press the first piston 33 so that the first piston 33 moves forward quickly. As a result, before the brake booster 1 outputs from the output shaft 32, the front end of the second cup packing 39 of the first piston 33 passes the open end 31a of the first fluid path 31, as shown in FIG. 4. The first fluid chamber 36 is thus communicated with the second fluid chamber 37 through the first fluid path 31, the space between the back of the second cup packing 39 and the cylinder member 30, and the second fluid path 34 so as to allow the fluid within the first fluid chamber 36 to flow into the second fluid chamber 37, with the result that the second piston 35 backs relative to the cylinder member 30. Accordingly, the pressure within the first fluid chamber 36 does not rise so that the reaction force is not exerted to the first piston 33 i.e. the reaction mechanism is canceled instantly. As a result, the valve plunger 20 moves forward to reach a maximum all at once to open the air valve 28 in full so that the output of the brake booster 1 reaches to the full load all at once. Thus, the brake booster 1 outputs the maximum output all at once so that the master cylinder 49 develops the maximum brake fluid pressure, thereby making emergency braking. The brake fluid in this case is also controlled by the ABS.

Once the brake pedal 48 is released to cancel the emergency braking, similarly to the case of the normal braking, the input shaft 21, the valve plunger 20, the valve body 7, and the power pistons 10, 11, and the output shaft 32 are returned at this time, the first piston 33 is returned by the biasing force of the first piston spring 42. By the returning motion of the spring 42, the fluid within the second fluid chamber 37 flows the first fluid chamber 36 through the second cup packing 39, with the result that the second piston 35 moves forward by the biasing force of the second piston spring 43. Finally, the first piston 33 comes into contact with the stepped portion 30a of the cylinder member 30 to be in its non-operation position and the second piston 35 comes into contact with the first piston 33 to be in its non-operation position.

As mentioned above, according to this embodiment, the output of the brake booster 1 is increased to the full load all at once by instantly stopping the reaction mechanism all at once for emergency braking, thereby rapidly and securely providing the emergency braking. Therefore, the operational responsibility of the brake booster 1 during emergency braking is improved.

Moreover, the brake booster 1 of this embodiment can be made only by adding the cylinder member 20, the first and second pistons 33 and 35, springs 42 and 43, and the cup packings 38, 39, 40, and 41 to a conventional brake booster without adding an electric device such as an electromagnetic valve, thereby making the structure of the brake booster 1 relatively simple and highly reliable, and reducing the cost of the brake booster 1.

Though the cylinder member 30 and the valve plunger 7 are separately provided in this embodiment, the present invention allows the cylinder member 30 to be integrally formed with the valve plunger 7.

Moreover, though the present invention is applied to a brake booster of a tandem type where two power pistons are arranged in series, the present invention can be applied to a brake booster of a single type, where one piston is arranged, and also to a vacuum booster of a tandem type where four or more pistons are arranged in series.

As clear from the above description, according to the brake booster of the present invention, the fluid filled and sealed in a space between the valve plunger and the output shaft to act as the reaction mechanism is controlled by the mechanical control valve actuated by the valve plunger so as to stop instantly the reaction mechanism during emergency braking, thereby allowing the output of the brake booster to reach the full load all at once. Therefore, even when the pedaling pressure of the driver is not enough for emergency braking, rapid and secure braking can be provided, thereby further improving the safety of the vehicle.

Moreover, since the brake booster is controlled by the mechanical control valve, there is no need for providing an electric device such as an electromagnetic valve and a stroke sensor, thereby making the structure of the brake booster relatively simple and highly reliable, and reducing the cost of the brake booster and the cost of the braking equipment.

What we claim is:

1. A brake booster comprising, front and rear shells attached together to form a space therein, a valve body situated in the space to move forwardly and backwardly and piercing the rear shell sealingly and slidably, a power piston connected to the valve body and dividing the space into a constant pressure chamber in which vacuum force is introduced and a variable pressure chamber in which atmosphere is introduced during braking, a valve plunger slidably disposed in the valve body, an input shaft connected to the valve plunger and arranged to move forwardly and backwardly in the valve body, said input shaft receiving a brake operation at one end thereof, a vacuum valve disposed in the valve body and controlled by a movement of the valve plunger, said vacuum valve controlling communication between the constant chamber and the variable chamber, an air valve disposed in the valve body and controlled by the movement of the valve plunger, said air valve controlling communication between the variable chamber and atmosphere, an output shaft connected to the valve body for outputting the braking operation to an external device, a first fluid chamber disposed between the valve plunger and the output shaft and filled with fluid, a second fluid chamber situated adjacent to the first fluid chamber and filled with fluid, and a fluid flow control valve situated between the first and second fluid chambers, said control valve blocking fluid communication from the first fluid chamber to the second fluid chamber when the valve plunger moves forwardly at a speed less than a predetermined speed at a normal braking, and permitting fluid communication from the first fluid chamber to the second fluid chamber when the valve plunger moves forwardly at a speed more than the predetermined speed at an emergency braking so that the air valve opens widely to immediately perform the braking operation at a maximum condition.

2. A brake booster as claimed in claim 1, further comprising a fluid path between the first and second fluid chambers, said fluid path allowing communication between the first and second fluid chambers when the control valve is moved to a predetermined portion at the emergency braking.

3. A brake booster as claimed in claim 2, wherein said output shaft includes an outer cylinder portion at one end, and said valve body includes a cylinder member situated inside the outer cylinder portion to define said first fluid chamber between the outer cylinder portion and the cylinder member, said cylinder member having said fluid path therein and forming said second fluid chamber inside thereof.

4. A brake booster as claimed in claim 3, wherein said valve plunger includes a piston situated inside the cylinder member of the valve body to form said second fluid chamber between the piston and the cylinder member, said control valve being situated around the piston.

5. A brake booster as claimed in claim 4, further comprising a spring situated between the output shaft and the piston to urge the piston in a direction away from the output shaft, said output shaft providing a reaction force at the normal braking to restrict a forward movement of the valve plunger.

* * * * *